United States Patent

Matui

[19]

[11] Patent Number: 6,035,006
[45] Date of Patent: Mar. 7, 2000

[54] ESTIMATOR HAVING A FEEDBACK LOOP

[75] Inventor: Hitosi Matui, Tokyo, Japan

[73] Assignee: NEC Corporation, Tokyo, Japan

[21] Appl. No.: 08/886,016

[22] Filed: Jun. 30, 1997

[30] Foreign Application Priority Data

Jun. 28, 1996 [JP] Japan ..................................... 8-169923

[51] Int. Cl.$^7$ .............................. H03D 1/00; H04L 27/06
[52] U.S. Cl. .......................... 375/340; 375/229; 375/346; 375/348; 370/286
[58] Field of Search ..................................... 375/340, 346, 375/348, 285, 229, 233; 370/286, 289

[56] References Cited

U.S. PATENT DOCUMENTS

| | | | |
|---|---|---|---|
| 4,878,232 | 10/1989 | Fisher ....................................... | 375/111 |
| 5,594,756 | 1/1997 | Sakurai et al. ........................... | 375/233 |
| 5,748,677 | 5/1998 | Kummar ................................. | 375/285 |

FOREIGN PATENT DOCUMENTS

| | | |
|---|---|---|
| 6-97769 | 4/1994 | Japan . |
| 6-295535 | 10/1994 | Japan . |
| 8-8788 | 1/1996 | Japan . |

OTHER PUBLICATIONS

Alexandra Duel–Hallen, et al., "Delayed Decision–Feedback Sequence Estimation", IEEE Transactions on Communications, vol. 37, No. 5, May 1989, pp. 428–436.

Hitoshi Matsui, "Hisenkeiwai Tokayou Tekio Bitabi Tokaki" [Viterbi Equalizer Applied for Equalization of Non–Linear Distortion], Institute of Electronics, Information, and Communication Engineers Technical Research Report, MR91–54–64, vol. 91, No. 385 (Dec. 17, 1991), pp. 23–18.

Hitoshi Matsui, "Chien Hantei Kikangata Saiyuu Fukugoho ni yoru Hisenkeiwai no Toka Tokusei" [Characteristics in Equalization of Non–Linear Distortion by Delayed Decision–Feedback Maximum Likelihood Decoding Method], Proceedings of the Fall, 1991 Conference of the Institute of Electronics, Information, and Communication Engineers, [vol. 5] (Aug. 15, 1991), pp. 5–17.

Matui, "Adaptive Reduced–State Sequence Estimation in Magnetic Digital Recording Channels" *NEC Research & Develop.* 35:188–194 (1994).

Duel–Hallen, "Delayed Decision–Feedback Sequence Estimation" *IEEE Transaction on Communications* 37:428–436 (1989).

*Primary Examiner*—Stephen Chin
*Assistant Examiner*—Mohammad Ghayour
*Attorney, Agent, or Firm*—Foley & Lardner

[57] ABSTRACT

A signal estimation loop includes a postcursor estimator which generates all possible postcursor estimation signals in a first past symbol period which is one symbol earlier based on a past estimated signal in a second past symbol period which is at least two symbols earlier. One of the possible postcursor estimation signals is selected based on the estimated signal to output a postcursor estimation signal to a subtracter in the symbol period. The subtracter subtracts the postcursor estimation signal from an input signal to produce a difference signal which is used to generate the estimated signal.

18 Claims, 7 Drawing Sheets

ESTIMATOR HAVING A FEEDBACK LOOP

BACKGROUND OF THE INVENTION

1. Field of the Invention

The present invention generally relates to data transmission, and in particular to signal estimation in the presence of distortion such as intersymbol interference (ISI).

2. Description of the Related Art

There has been proposed Delayed decision-feedback sequence estimation (DDFSE), which is a method of estimating the distorted signals, in "Delayed Decision Feedback Sequence Estimation" by A. Duel-Hallen and C. Heegard (IEEE Transactions on communications, pp 428–436, Vol. 37, No. 5, May 1989). DDFSE is an estimation algorithm that would reduce computational complexity with only slight degradation in the quality of signal estimation compared with MLSE (maximum-likelihood sequence estimation) in digital communications over intersymbol interference channels.

As another method for estimating the distorted signals, the inventor has proposed an adaptive reduced-state sequence estimation in NEC Research & Development (pp 188–194, Vol. 35, No. 2, April 1994). the adaptive reduced-state sequence estimation (RSSE) uses a memory table to estimate both linearly and nonlinearly distorted signals with employing a loop configuration for feedback of estimated data.

In a signal estimator employing the feedback loop configuration as described above, it is necessary to complete a set of computations within a time period of a symbol. More specifically, as shown in FIG. 1, the estimator performs three kinds of computations, that is, generation of estimated signals, generation of branch metrics, and comparison for path metric selection, within the time period of Ts. In the case of a Viterbi algorithm having no loop therein, pipeline processing can be employed to achieve high-speed computation. However, since the signal estimator uses estimated data one symbol before for calculation of the subsequent symbol, the pipeline processing cannot be employed.

Therefore, to achieve high-speed computation, the signal estimator needs a high-speed arithmetic circuit which increases in consumption power, providing a tradeoff between speed and power consumption.

SUMMARY OF THE INVENTION

An object of the present invention is to provide an estimation loop and a signal estimator including the same, which can achieve high-speed computations without increasing in power consumption.

Another object of the present invention is to provide a signal estimator which can reduce in delay time due to feedback computations so as to be applicable to a high-speed data transmission.

A signal estimation loop according to an aspect of the present invention generates an estimated signal from an input signal in each symbol period, wherein the input signal is received through a channel having an impulse response including a postcursor component for a plurality of symbols. The signal estimation loop includes a subtracter, a postcursor estimator, and a selector. The subtracter subtracts a postcursor estimation signal from the input signal to produce a subtracted signal which is used to generate the estimated signal. The postcursor estimator generates all possible postcursor estimation signals in a first past symbol period which is one symbol earlier based on a past estimated signal in a second past symbol period which is at least two symbols earlier. And the selector selects one of the possible postcursor estimation signals based on the estimated signal to output a selected one as the postcursor estimation signal to the subtracter in the symbol period.

Since all possible postcursor estimation signals are generated in the first past symbol period which is one symbol earlier and one of them is selected in the symbol period, high-speed estimation can be achieved.

A signal estimator according to another aspect of the present invention includes a first estimator for estimating the input signal based on the precursor component and center component to produce a first estimated signal, a delay memory for storing the first estimated signal to delay one symbol, and the signal estimation loop.

Since the precursor component and center component are canceled from the input signal before the postcursor estimation, the precursor, center and postcursor estimation can be performed in pipeline processing, resulting in further high-speed estimation.

DETAILED DESCRIPTION OF THE REFEREED EMBODIMENT

Figure 1:
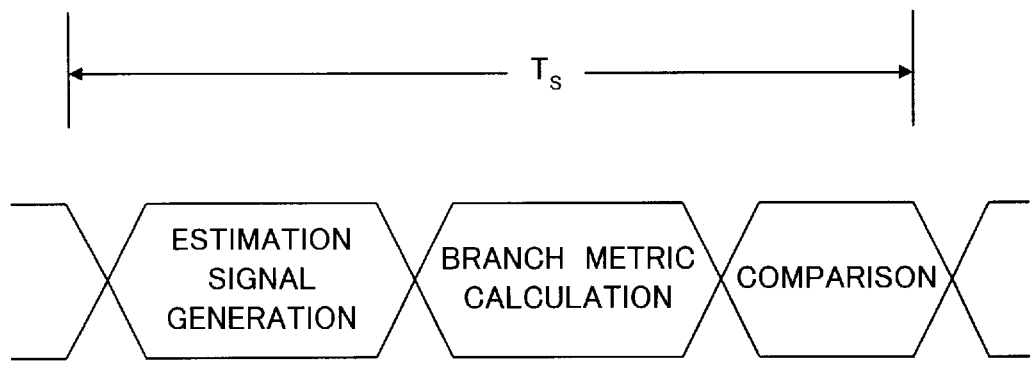
FIG. 1 is a time chart showing an operation of a conventional signal estimator having a feedback loop.
Figure 2:
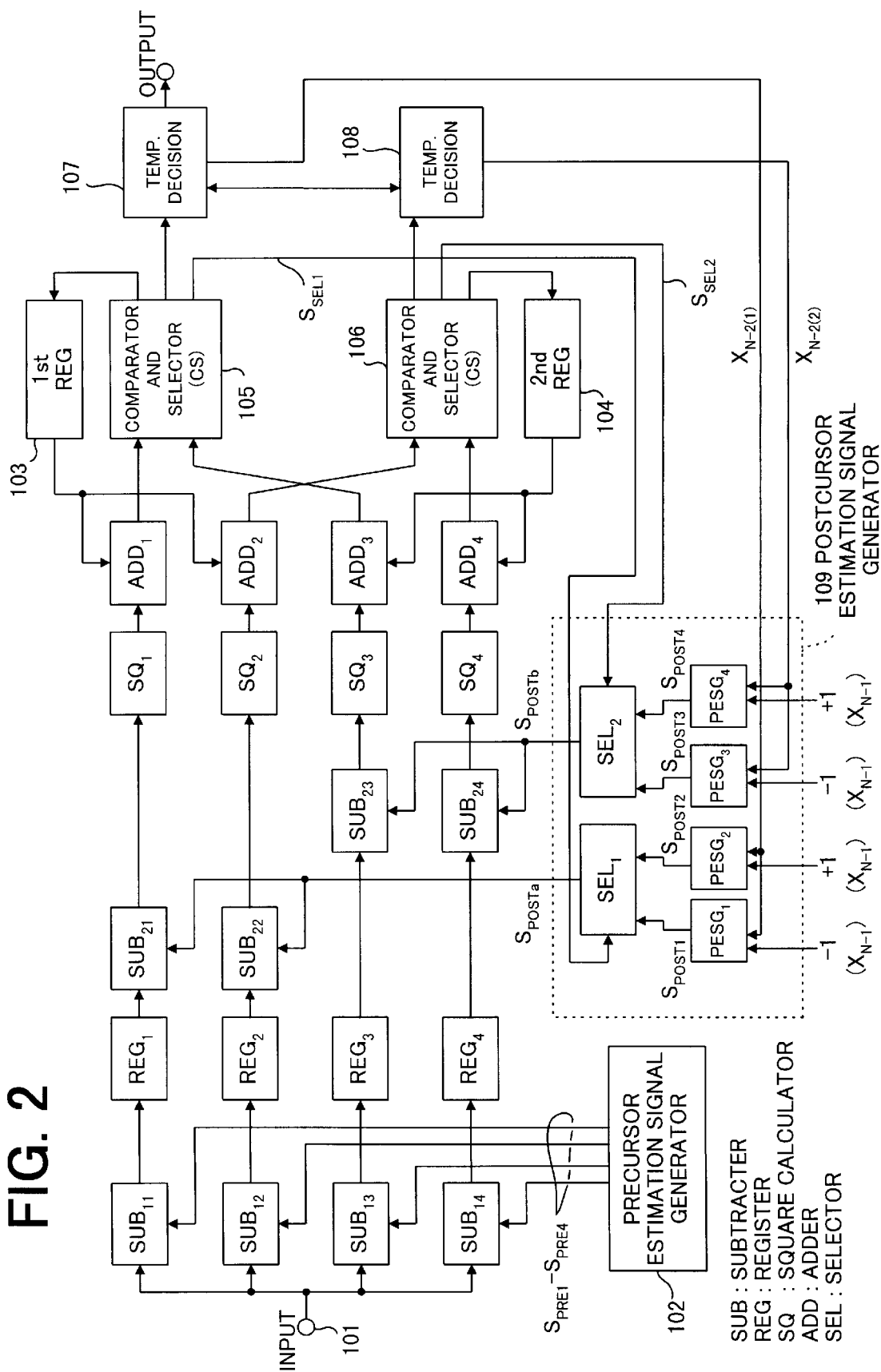
FIG. 2 is a block diagram showing a signal estimator according to an embodiment of the present invention.

Referring to FIG. 2, there is shown a signal estimator according to an embodiment of the present invention. In general, transmission data has K values (K is an integer) and a transmission channel exhibits an impulse response including a precursor component for N symbols, $a_0-a_{N-1}$, a center component for one symbol, $a_N$, and a postcursor component for M symbols, $a_{N+1}-a_{N+1}$, where N and M are an integer.

Figure 3:
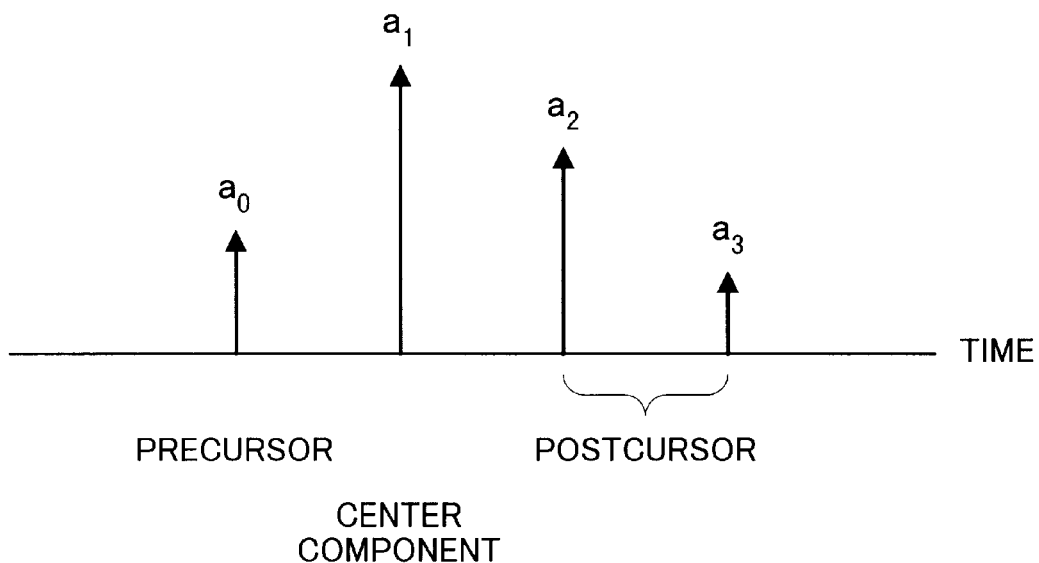
FIG. 3 is a diagram showing an example of an impulse response of transmission channel for explanation of an operation of the embodiment.

In this embodiment, assume K=2, M=2 and N=1 for simplicity. More specifically, the transmission data has two values: +1 and −1, and the transmission channel exhibits an impulse response including a precursor component of $a_0$, a center component of $a_1$, and a postcursor component of $a_2$ and $a_3$, as shown in FIG. 3.

In FIG. 2, input data which may be subjected to distortion due to ISI channel is received at an input terminal 101 and is supplied in common to four subtracters $SUB_{11}-SUB_{14}$. The respective subtracters $SUB_{11}-SUB_{14}$ subtract precursor estimation signals $S_{PRES1}-S_{PRS4}$ from the input data. The precursor estimation signals $S_{PRE1}-S_{PRE4}$ are generated by a precursor estimation signal generator 102. More specifically, the precursor estimation signals $S_{PRE1}-S_{PRE4}$ are four estimated precursor and center signal components which are generated in four cases of transmission data ($X_N$, $X_{N+1}$), (−1, −1), (+1, −1), (−1, +1), and (+1, +1), respectively.

The first difference signals between the input data and the precursor estimation signals $S_{PRB1}$–$S_{PRE4}$ are stored onto registers $REG_1$–$REG_4$ for one-symbol delay, respectively. As will be described later, the registers $REG_1$–$REG_4$ allow pipeline processing.

The respective first difference signals stored in the registers $REG_1$–$REG_4$ are supplied to four subtracters $SUB_{21}$–$SUB_{24}$. The first two subtracters $SUB_{21}$ and $SUB_{22}$ subtract a postcursor estimation signal $S_{POSTa}$ from the first difference signals stored in the registers $REG_1$ and $REG_2$, respectively. Similarly, the other two subtracters $SUB_{22}$ and $SUB_{24}$ subtract a postcursor estimation signal $S_{POSTb}$ from the first difference signals stored in the registers $REG_2$ and $REG_4$, respectively.

The second difference signals output from the subtracters $SUB_{21}$–$SUB_{24}$ are squared by a square calculators $SQ_1$–$SQ_4$, respectively. The second difference signals are used as four branch metrics which are output to adders $ADD_1$–$ADD_4$, respectively. The adders $ADD_1$ and $ADD_2$ add a first selected path metric stored in a register 103 to the first and second branch metrics of the square calculators $SQ_1$ and $SQ_2$, respectively, to produce two path metrics. Similarly, the adders $ADD_3$ and $ADD_4$ add a second selected path metric stored in a register 104 to the third and fourth branch metrics of the square calculators $SQ_3$ and $SQ_4$, respectively, to produce two path metrics. The respective path metrics from the $ADD_1$ and $ADD_3$ are output to a first comparator and selector (CS) 105 which compares them and selects one which is smaller. The selected one is stored as the first selected path metric onto the register 103. Similarly, the respective path metrics from the $ADD_2$ and $ADD_4$ are output to a second CS 106 which compares them and selects one which is smaller. The selected one is stored as the second selected path metric onto the register 104. The respective CSs 105 and 106 output selection signals $S_{SEL1}$ and $S_{SEL2}$ each indicating which path metric is selected to first and second temporary decision sections 107 and 107.

The first and second temporary decision sections 107 and 108 store temporary decision data sequences corresponding to survivors, respectively, and the first temporary decision sections 107 selects one of the two survivor paths according to Viterbi algorithm to output estimated data corresponding to the original transmitted sequence. The first and second temporary decision sections 107 and 108 further output the data sequences of survivor paths to a postcursor estimation signal generator 109.

The postcursor estimation signal generator 109 includes fourth postcursor estimation signal generators $PESG_1$–$PESG_4$ and two selectors $SEL_1$ and $SEL_2$. The postcursor estimation signal generators $PESG_1$–$PESG_4$ are supplied with predetermined values: −1, +1, −1, and +1, respectively, which are used as temporary decision data $X_{N-1}$ one symbol before. In other words, the previous decision data $X_{N-1}$ is not received from the temporary decision sections 107 and 108 but given as predetermined data. The further previous decision data $X_{N-2}$ is received from the temporary decision sections 107 and 108. Here, the postcursor estimation signal generators $PESG_1$ and $PESG_3$ receive the decision data $X_{N-2}$ from the temporary decision section 107 and the other postcursor estimation signal generators $PESG_2$ and $PESG_4$ receive the decision data $X_{N-1}$ from the temporary decision section 108. Therefore, upon reception of the decision data $X_{N-2}$, each of the postcursor estimation signal generators $PESG_1$–$PESG_4$ can start calculating a postcursor estimation signal as will be described in detail.

More specifically, the postcursor estimation signal generator $PESG_1$ generates a postcursor estimation signals $S_{POST1}$ when $X_{N-1}$ is −1 and $X_{N-2(1)}$ is received from the temporary decision section 107. The postcursor estimation signal generator $PESG_2$ generates a postcursor estimation signal $S_{POST2}$ when $X_{N-1}$ is +1 and $X_{N-2(1)}$ is received from the temporary decision section 107. The postcursor estimation signal generator $PESG_3$ generates a postcursor estimation signal $S_{POST3}$ when $X_{N-1}$ is −1 and $X_{N-2(2)}$ is received from the temporary decision section 108. The postcursor estimation signal generator $PESG_4$ generates a postcursor estimation signal $S_{POST4}$ when $X_{N-1}$ is +1 and $X_{N-2(2)}$ is received from the temporary decision section 108. The postcursor estimation signals $S_{POST1}$ and $S_{POST2}$ are output to the selector $SEL_1$ and the postcursor estimation signals $S_{POST3}$ and $S_{POST4}$ are output to the selector $SEL_2$.

The selector $SEL_1$ selects the first selected postcursor estimation signal $S_{POSTa}$ from the postcursor estimation signals $S_{POST1}$ and $S_{POST2}$ according to the selection signal $S_{SEL1}$ received from the first CS 105. The selector $SEL_2$ selects the second selected postcursor estimation signal $S_{POSTb}$ from the postcursor estimation signals $S_{POST3}$ and $S_{POST4}$ according to the selection signal $S_{SEL2}$ received from the second CS 106. As described before, the selected postcursor estimation signal $S_{POSTa}$ is output to the subtracters $SUB_{21}$ and $SUB_{22}$ and the selected postcursor estimation signal $S_{POSTb}$ is output to the subtracters $SUB_{23}$ and $SUB_{24}$.

OPERATION

Assume that a transmission data sequence is ($X_{N-2}$, $X_{N-1}$, $X_N$, $X_{N+1}$) and the transmission channel has the impulse response as shown in FIG. 3. In this case, the input signal which is subjected to distortion due to the ISI channel is represented as follows:

$$X_{N+1}a_0 + X_N a_1 + X_{N-1}a_2 + X_{N-2}a_3.$$

The precursor estimation signal generator 102 generates the precursor estimation signals $S_{PRE1}$–$S_{PRE4}$ by calculating the ($X_{N+1}a_0 + X_N a_1$) in the respective cases of transmission data ($X_N$, $X_{N+1}$); (−1, −1), (+1, −1), (−1, +1), and (+1, +1). The respective subtracters $SUB_{11}$–$SUB_{14}$ subtract the precursor estimation signals $S_{PRE1}$–$S_{PRE4}$ from the input signals. Therefore, one of the first difference signals is a signal obtained by canceling the precursor signal component and center signal component from the input signal. The precursor estimation can be separated from the decision feedback loop by storing the respective first difference signals onto the registers $REG_1$–$REG_4$ to delay one symbol. In other words, the precursor estimation can be completed one symbol before the postcursor estimation.

The respective first difference signals stored in the registers $REG_1$–$REG_4$ are supplied to the subtracters $SUB_{21}$–$SUB_{24}$. The subtracters $SUB_{21}$ and $SUB_{22}$ subtract the postcursor estimation signal $S_{POSTa}$ from the first difference signals stored in the registers $REG_1$ and $REG_2$, respectively, and the other two subtracters $SUB_{23}$ and $SUB_{24}$ subtract the postcursor estimation signal $S_{POSTb}$ from the first difference signals stored in the registers $REG_3$ and $REG_4$, respectively. The respective subtracters $SUB_{21}$–$SUB_{24}$ output the second difference signals to the square calculators $SQ_1$–$SQ_4$ for computations of branch metrics.

The postcursor estimation signals $S_{POSTa}$ and $S_{POSTb}$ are represented by $(X_{N-1}a_2+X_{N-2}a_3)$ which is generated by the postcursor estimation signal generator 109 using all possible combinations of the predetermined possible data $X_{N-1}$, −1 or +1, and the temporary decision data $X_{N-2}$ received from the temporary decision sections 107 and 108 to select the postcursor estimation signals $S_{POSTa}$ and $S_{POSTb}$ according to the selection signals $S_{SEL1}$ and $S_{SEL2}$ as described before.

Figure 4:
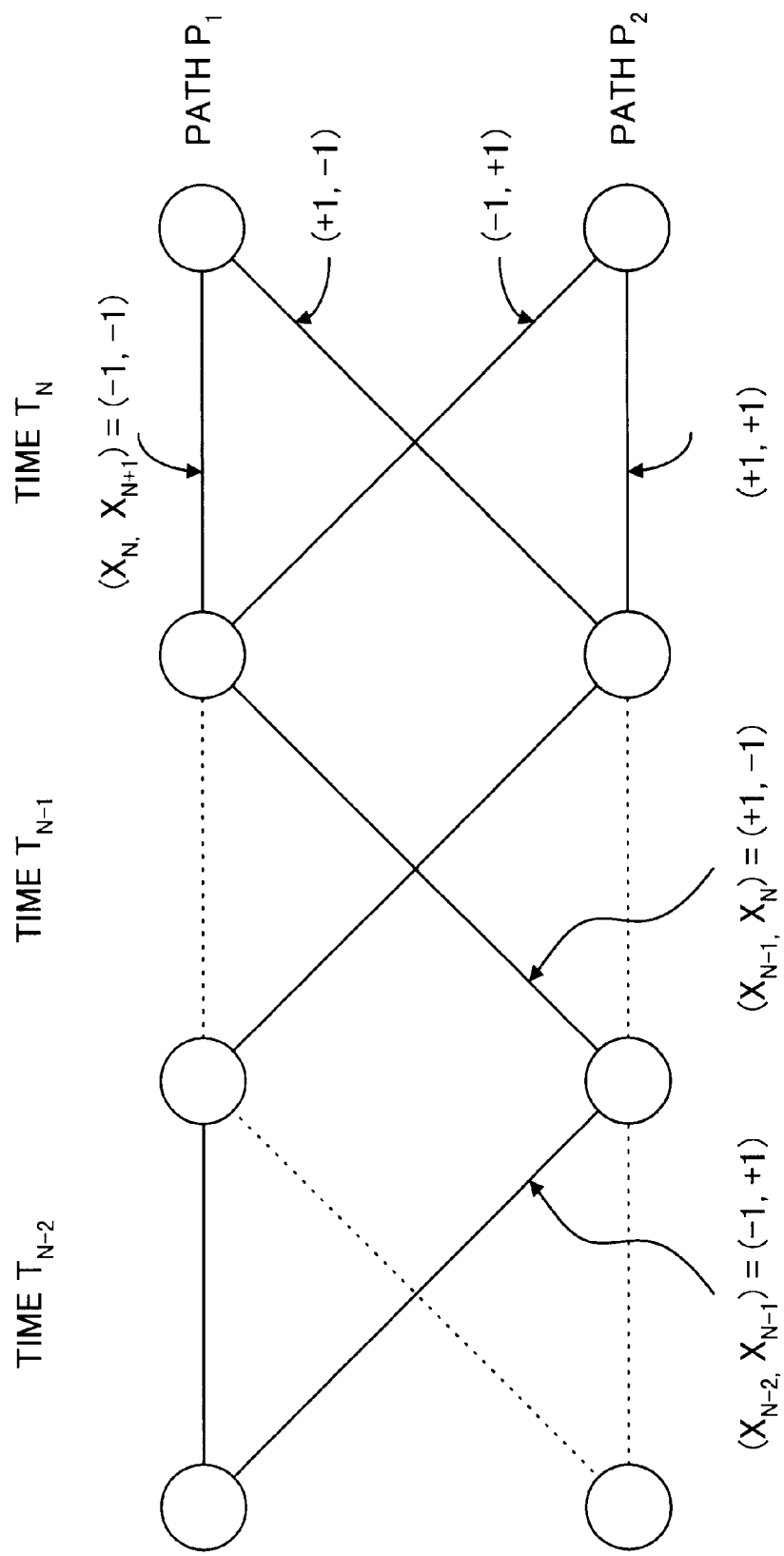
FIG. 4 is a diagram showing the operation of the embodiment in Viterbi algorithm.

Referring to FIG. 4, comparisons will be made with the conventional signal estimator. According to prior art, each of the postcursor estimation signals $S_{POSTa}$ and $S_{POSTb}$, $(X_{N-1}a_2+X_{N-2}a_2)$, are calculated from only temporary decision data $X_{N-1}$ and $X_{N-2}$ received from the temporary decision sections 107 and 108. In other words, in FIG. 4, when calculating branch metrics at time $T_N$, it is necessary to calculate temporary decision data from survivor paths at time $T_{N-1}$ and $T_{N-2}$ which are continuous paths to the paths $P_1$ and $P_1$, respectively. Especially, in the case where the postcursor component of the impulse response is a long time away from no effect on subsequent signals, the time required for calculation becomes longer. Therefore, with increasing symbol rate, it becomes impossible to keep the branch metric calculation at time $T_N$ waiting until survivor paths at time $T_{N-1}$ are decided.

Contrarily, according to the embodiment of the present invention, all possible postcursor estimation signals $S_{POST1}$–$S_{POST4}$ at time $T_{N-1}$ are calculated when receiving the temporary decision data $X_{N-2}$ and then only selection is performed at time $T_{N-1}$ according to the selection signals $S_{SEL1}$ and $S_{SEL2}$. The temporary decision data $X_{N-2(1)}$ and $X_{N-2(2)}$ are received from the temporary decision sections 107 and 108, respectively, because of sufficient lead time (2 symbols) to perform calculation of survivor paths at time $T_{N-2}$. More specifically, the postcursor estimation signal generators $PESG_1$–$PESG_4$ calculate $S_{POST1}=(-1\times a_2+X_{N-2(1)}\times a_3)$, $S_{POST2}=(+1\times a_2+X_{N-2(1)}\times a_3)$, $S_{POST3}=(-1\times a_2+X_{N-2(2)}\times a_3)$, and $S_{POST4}=(-1\times a_2+X_{N-(2)}\times a_3)$, respectively, and then the selectors $SEL_1$ and $SEL_2$ select the postcursor estimation signals $S_{POSTa}$ and $S_{POSTb}$ from them according to the selection signals $S_{SEL1}$ and $S_{SEL2}$, respectively. Similarly, all possible postcursor estimation signals $S_{POST1}$–$S_{POST4}$ at time $T_N$ are calculated when receiving the temporary decision data $X_{N-1}$.

Therefore, it is necessary to operate a feedback loop including the subtracters $SUB_{21}$–$SUB_{24}$, the square calculators $SQ_1$–$SQ_4$, the adders $ADD_1$–$ADD_4$, the CSs 105 and 106, and the selectors $SEL_1$ and $SEL_2$ within one symbol. Since the respective selectors $SEL_1$ and $SEL_2$ can perform the selection operation within the time required for a single logical gate, the feedback loop can work within a sufficiently short time period, resulting in high-speed postcursor estimation applicable to high-speed data transmission.

Figure 5:
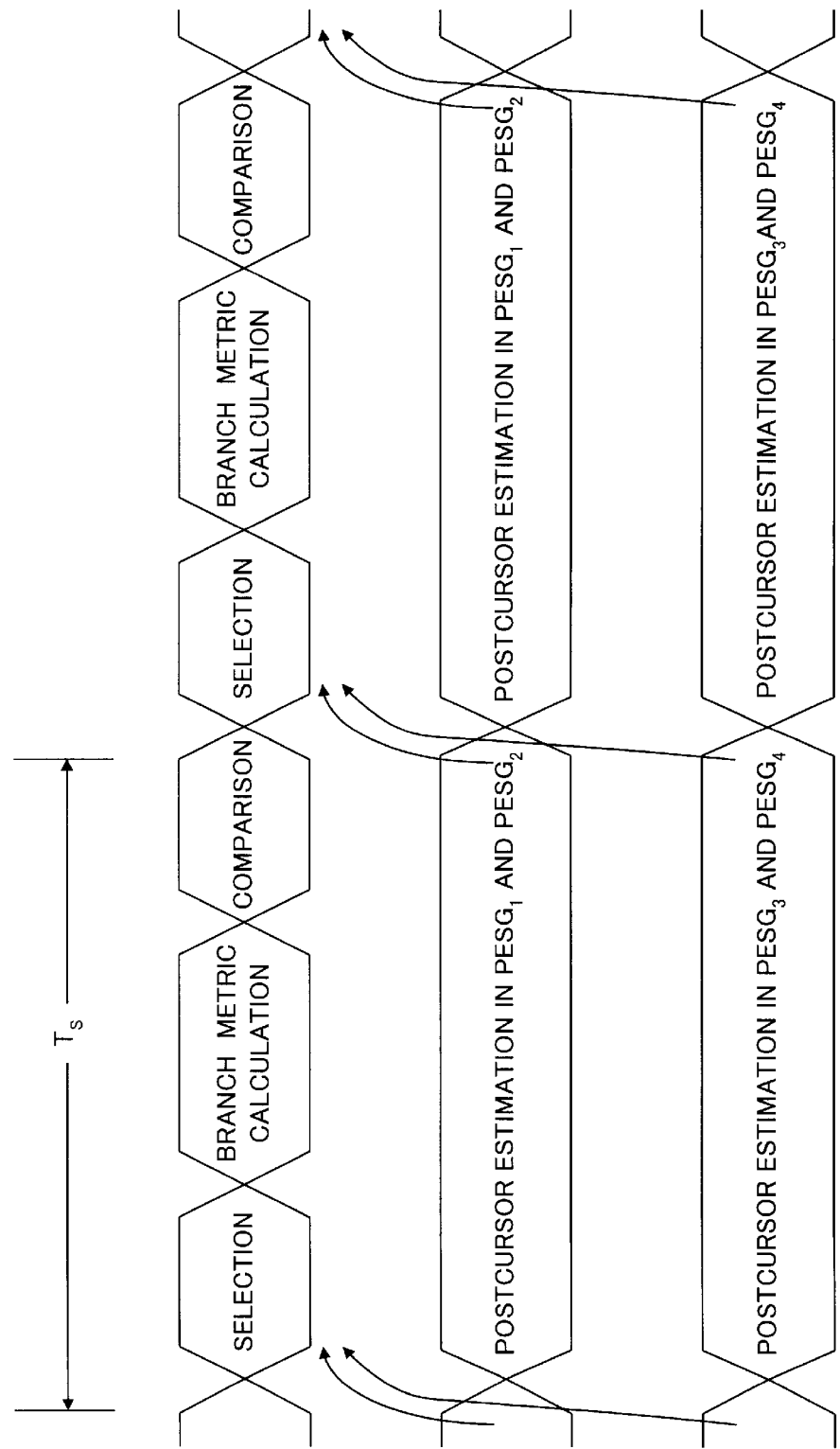
FIG. 5 is a time chart showing an operation of the embodiment.

Referring to FIG. 5, in the one-symbol time period Ts, the selectors $SEL_1$ and $SEL_2$ perform the selection of the postcursor estimation signals $S_{POSTa}$ and $S_{POSTb}$ from the postcursor estimation signals $S_{POST1}$–$S_{POST4}$ which were already calculated in the preceding time period. After that, the branch metric calculations and the ACS (Add-Compare-Select) computations are performed. At the same time, all possible postcursor estimation signals $S_{POST1}$–$S_{POST4}$ which will be used in the following time period are generated by the postcursor estimation signal generators $PESG_1$–$PESG_4$. In this manner, the whole processing time can be reduced.

Figure 6:
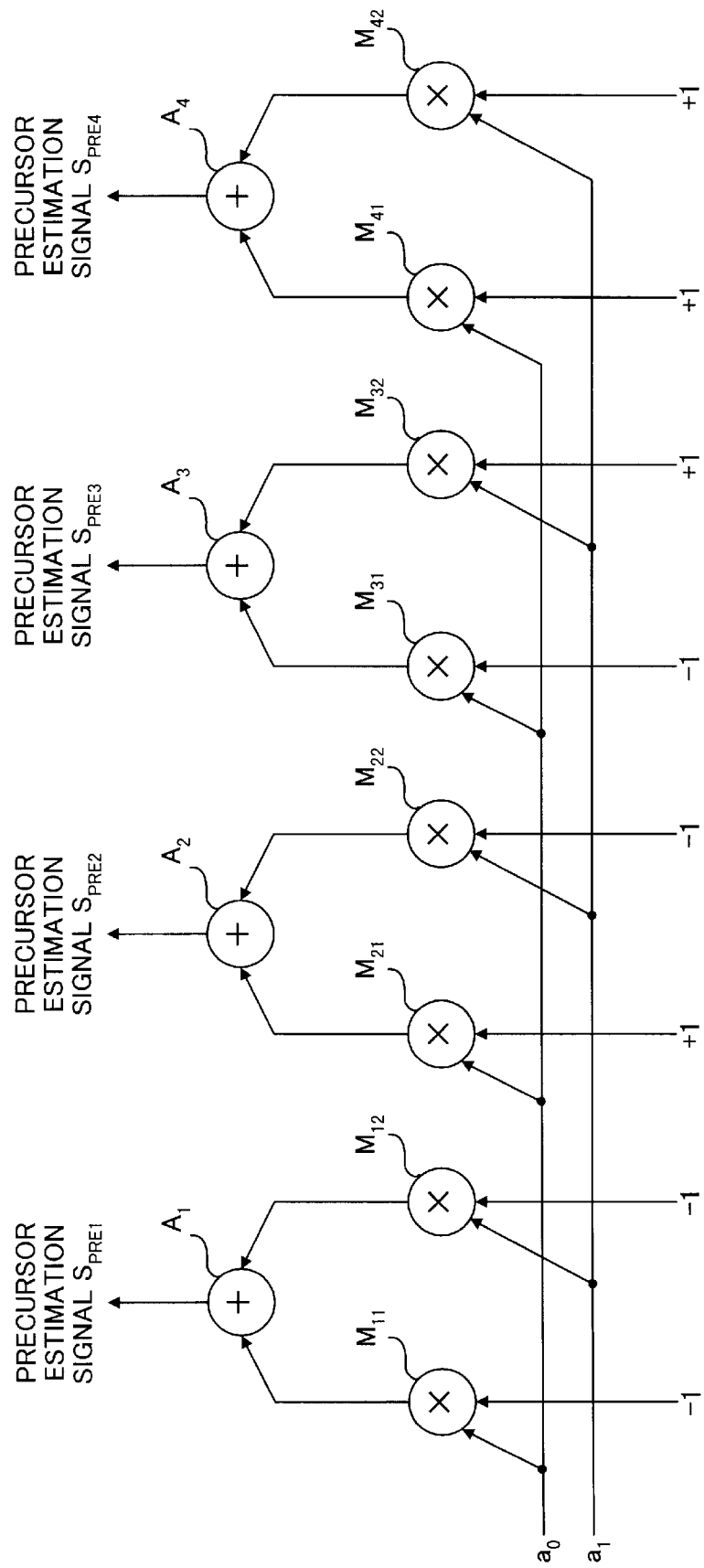
FIG. 6 is a detailed block diagram showing the configuration of a precursor estimation signal generator in the embodiment.

Referring to FIG. 6, there is shown an example of the precursor estimation signal generator 102. This is comprised of four transversal filters each including two multipliers and one adder. Taking a first transversal filter as an example, a multiplier $M_{11}$ inputs $a_0$ and −1, a multiplier $M_{12}$ inputs $a_1$ and −1, and an adder $A_1$ adds the respective products to produce the precursor estimation signal $S_{PRE1}$, $(-a_0-a_1)$. Similarly, the respective precursor estimation signals $S_{PRE2}$–$S_{PRE4}$ are $(+a_0-a_1)$, $(-a_0+a_1)$, and $(+a_0+a_1)$.

Figure 7:
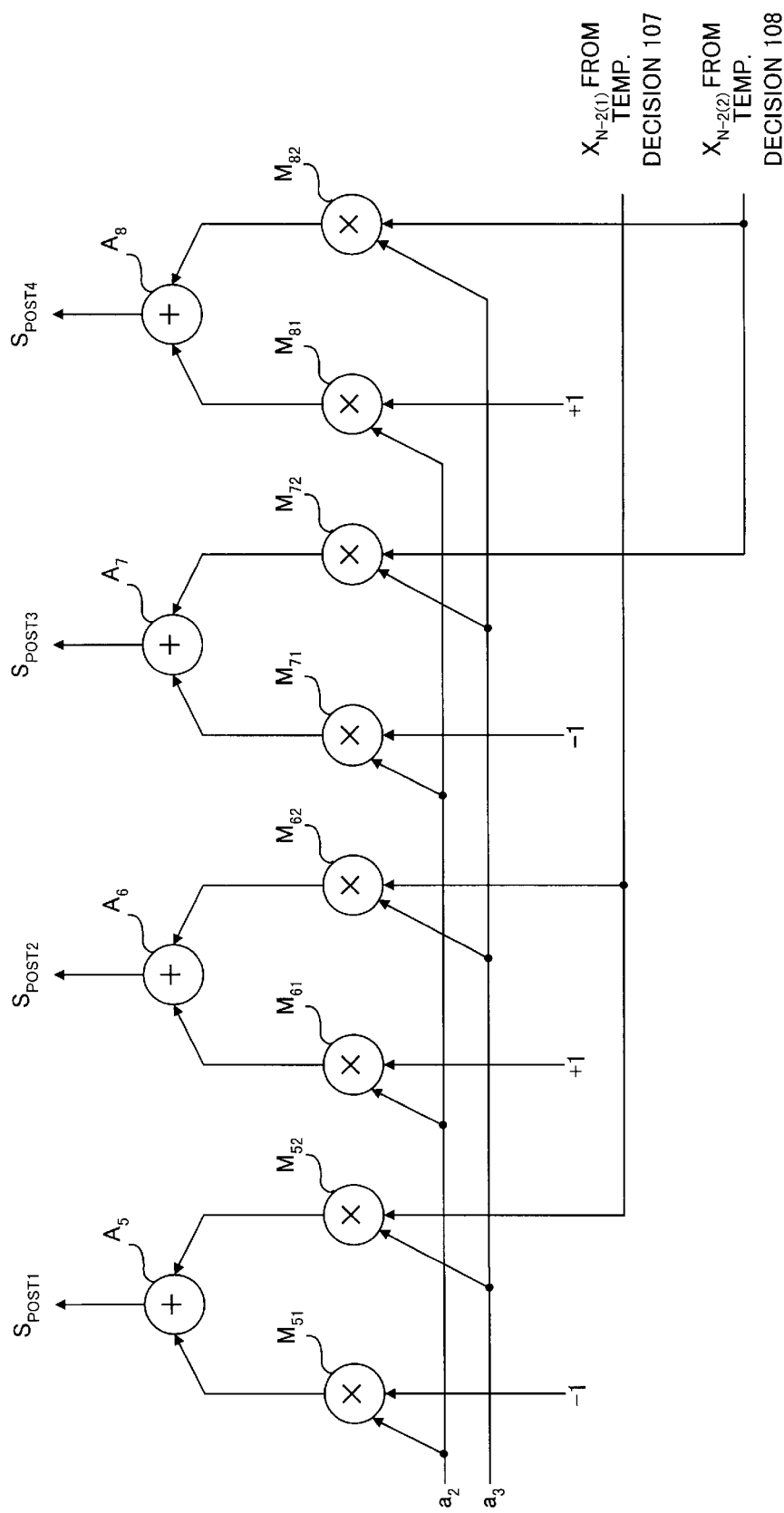
FIG. 7 is a detailed block diagram showing the configuration of a postcursor estimation signal generator in the embodiment.

Referring to FIG. 7, there is shown an example of the postcursor estimation signal generator 109. This is also comprised of four transversal filters each including two multipliers and one adder. Taking a first transversal filter as an example, a multiplier $M_{51}$ inputs $a_2$ −1, a multiplier $M_{52}$ inputs $a_3$ and $X_{M-2(1)}$, and an adder $A_5$ adds the respective products to produce the postcursor estimation signal $S_{POST1}$, $(-a_1+X_{N-2(1)}a_3)$. Similarly, the respective postcursor estimation signals $S_{POST2}$–$S_{POST4}$ are $(+a_2+X_{N-2(1)}a_3)$, $(-a_2+X_{N-2(2)}a_1)$, and $(+a_2+X_{N-3(2)}a_3)$.

In general, the transmission data has K values and a transmission channel exhibits an impulse response including a precursor component for N symbols, a center component for one symbol, and a postcursor component for M symbols. In such a general case, the precursor estimation signal generator 102 generates $K^{N-1}$ precursor estimation signals, resulting in the same number $(K^{N+1})$ of subtracters $SUB_{11}$, $SUB_{12}$ ..., registers $REG_1$, $REG_2$, ..., subtracters $SUB_{21}$, $SUB_{22}$ ..., square calculators $SQ_1$, $SQ_2$, ..., and adders $ADD_1$, $ADD_2$, ... Further, the postcursor estimation signal generator 109 has $K^{N+1}$ postcursor estimation signal generators $PESG_1$, $PESG_2$, ... and $2^M$ selectors $SEL_1$, $SEL_2$, ... Furthermore, the signal estimator is provided with $2^M$ CSs, $2^N$ registers, and $2^N$ temporary decision sections.

As described above, since the respective selectors $SEL_1$ and $SEL_2$ of the postcursor estimation signal generator 109 can perform the selection operation for a very short time, the total processing time is dramatically-reduced, resulting in high-speed postcursor estimation applicable to high-speed data transmission. Especially, in communications environments where multipath has a relatively large effect on performance, the postcursor component continues for a long time. In such cases, the signal estimator according to the present invention has great advantages because it can effectively and rapidly generates postcursor estimation signals for equalization.

What is claimed is:

1. A signal estimation loop for generating an estimated signal from an input signal in each symbol period, the input signal being received through a channel having an impulse response including a postcursor component for a plurality of symbols, the signal estimation loop comprising:

a subtracter for subtracting a postcursor estimation signal from the input signal to produce a difference signal which is used to generate the estimated signal;

a postcursor estimator for generating all possible postcursor estimation signals in a first past symbol period which is one symbol earlier based on a post estimated signal in a second past symbol period which is at least two symbols earlier; and a selector for selecting one of the possible postcursor estimation signals based on the estimated signal to output a selected one as the postcursor estimation signal to the subtracter in the symbol period.

2. The signal estimation loop according to claim 1, wherein the postcursor estimator generates all possible postcursors estimation signals using all combinations of the past estimated signal and all possible values which are predetermined in an estimated signal.

3. A signal estimator for generating an estimated signal from an input signal in each symbol period, the input signal being received through a channel having an impulse response including a precursor component for N symbols and a postcursor component for M symbols, where N and M are an integer, the signal estimator comprising:

a first subtracter for subtracting the precursor component from the input signal to produce a first difference signal;

a delay memory for storing the first difference signal to delay one symbol; and a feedback loop for generating the estimated signal from the first difference signal received from the delay memory in each symbol period, the feedback loop comprising:

a second subtracter for subtracting the first difference signal depending on a postcursor estimation signal to produce a second difference signal which is used to generate the estimated signal;

a postcursor estimator for generating all possible postcursor estimation signals in a first past symbol period which is one symbol earlier based on a past estimated signal in a second past symbol period which is at least two symbols earlier; and a selector for selecting one of the possible postcursor estimation signals based on the estimated signal to output a selected one as the postcursor estimation signal to the second subtracter in the symbol period.

4. The signal estimator according to claim 3, wherein the postcursor estimator generates all possible postcursor estimation signals using all combinations of the past estimated signal and all possible values which are predetermined in an estimated signal.

5. The signal estimator according to claim 3, wherein the first subtracter comprises:

a precursor estimator for generating a precursor estimation signal based on the precursor component and center component; and a first subtracter for subtracting the precursor estimation signal from the input signal to produce the first difference signal.

6. The signal estimator according to claim 3, wherein the second subtracter comprises a second subtracter for subtracting the postcursor estimation signal from the first difference signal to produce the second difference signal.

7. A signal estimation loop for estimating a received signal according to Viterbi algorithm, the received signal having K values (K is an integer greater than 1) and being subjected to distortion due to a channel having an impulse response including a precursor component for N symbols, a center component and a postcursor component for M symbols, where N and M are an integer, the signal estimation loop comprising:

a subtracter for subtracting $K^{N+1}$ postcursor estimation signals from the received signal to produce $K^{N+1}$ difference signals, respectively, the $K^{N+1}$ postcursor estimation signals being obtained by repeatedly using $2^M$ postcursor estimation signals;

a branch metric generator for generating $K^{N+1}$ branch metrics from the $K^{N+1}$ difference signals, respectively;

a path selector for selecting $2^N$ survivor paths from possible paths obtained based on the $K^{N-1}$ branch metrics to produce $2^N$ path selection signals each indicating which path is selected;

a decision processor for generating $2^N$ estimated signals for M symbols from the $2^N$ path selection signals;

a postcursor estimator for generating $K^{N+1}$ possible postcursor estimation signals in a first past symbol period which is one symbol earlier based on $2^N$ past estimated signals in a second past symbol period which is at least two symbols earlier; and a postcursor estimation selector for selecting the $2^N$ postcursor estimation signals from the $K^{N+1}$ possible postcursor estimation signals according to the $2^N$ path selection signals to output the $2^N$ postcursor estimation signals to the subtracter.

8. The signal estimation loop according to claim 7, wherein the postcursor estimator generates the $K^{N+1}$ possible postcursor estimation signals using all combinations of the $2^N$ past estimated signals and K possible values which are predetermined in an estimated signal.

9. The signal estimation loop according to claim 8, wherein the postcursor estimator comprises $K^{N+1}$ postcursor estimation signal generators for generating the $K^{N+1}$ possible postcursor estimation signals, respectively, by repeatedly using the $2^N$ past estimated signals and the K possible values.

10. The signal estimation loop according to claim 7, wherein the postcursor estimation selector comprises $2^N$ postcursor estimation selectors each selecting one of $K^{N+1}/2^N$ postcursor estimation signals.

11. A signal estimator for estimating a received signal according to Viterbi algorithm, the received signal having K values (K is an integer greater than 1) and being subjected to distortion due to a channel having an impulse response including a precursor component for N symbols, a center component and a postcursor component for M symbols, where N and M are an integer, the signal estimator comprising:

an precursor subtracter for subtracting $K^{N+1}$ precursor estimation signals from the received signal to produce $K^{N+1}$ first difference signals, the $K^{N+1}$ precursor estimation signals being generated based on the precursor component for N symbols and the center component;

a delay memory for storing the $K^{N+1}$ first difference signals to delay one symbol, respectively; and a feedback loop for generating $2^N$ estimated signals from the $K^{N+1}$ first difference signals received from the delay memory in each symbol period, the feedback loop comprising:

a subtracter for subtracting $K^{N+1}$ postcursor estimation signals from the $K^{N+1}$ first difference signal to produce $K^{N+1}$ second difference signals, respectively, the $K^{N+1}$ postcursor estimation signals being obtained by repeatedly using $2^N$ postcursor estimation signals;

a branch metric generator for generating $K^{N+1}$ branch metrics from the $K^{N+1}$ second difference signals, respectively;

a path selector for selecting $2^N$ survivor paths from possible paths obtained based on the $K^{N+1}$ branch metrics to produce $2^N$ path selection signals each indicating which path is selected;

a decision processor for generating $2^N$ estimated signals for M symbols from the $2^N$ path selection signals;

a postcursor estimator for generating $K^{N+1}$ possible postcursor estimation signals in a first past symbol period which is one symbol earlier based on $2^N$ past estimated signals in a second past symbol period which is at least two symbols earlier; and a postcursor estimation selector for selecting the $2^N$ postcursor estimation signals from the $K^{N+1}$ possible postcursor estimation signals according to the $2^N$ path selection signals to output the $2^N$ postcursor estimation signals to the subtracter.

12. The signal estimator according to claim 11, wherein the postcursor estimator generates the $K^{N-1}$ possible postcursor estimation signals using all combinations of the $2^N$ past estimated signals and K possible values which are predetermined in an estimated signal.

13. The signal estimator according to claim 12, wherein the postcursor estimator comprises $K^{N+1}$ postcursor estimation signal generators for generating the $K^{N+1}$ possible postcursor estimation signals, respectively, by repeatedly using the $2^N$ past estimated signals and the K possible values.

14. The signal estimation loop according to claim 11, wherein the postcursor estimation selector comprises $2^N$ postcursor estimation selectors each selecting one of $K^{N+1}/2^N$ postcursor estimation signals.

15. A signal estimation method for generating an estimated signal from an input signal in each symbol period, the input signal being received through a channel having an impulse response including a postcursor component for a plurality of symbols, the method comprising the steps of:

subtracting a postcursor estimation signal from the input signal to produce a difference signal which is used to generate the estimated signal;

generating all possible postcursor estimation signals in a first past symbol period which is one symbol earlier based on a past estimated signal in a second past symbol period which is at least two symbols earlier; and selecting one of the possible postcursor estimation signals based on the estimated signal to produce a selected one as the postcursor estimation signal in the symbol period.

16. The method according to claim 15, wherein all possible postcursor estimation signals are generated using all combinations of the past estimated signal and all possible values which are predetermined in an estimated signal.

17. A method for generating an estimated signal from an input signal in each symbol period, the input signal being received through a channel having an impulse response including a precursor component for N symbols and a postcursor component for M symbols, where N and M are an integer, the method comprising the steps of:

subtracting the precursor component from the input signal to produce a first difference signal;

storing the first equalized signal to delay one symbol;

subtracting the first difference signal depending on a postcursor estimation signal to produce a second difference signal which is used to generate the estimated signal;

generating all possible postcursor estimation signals in a first past symbol period which is one symbol earlier based on a past estimated signal in a second past symbol period which is at least two symbols earlier; and selecting one of the possible postcursor estimation signals based on the estimated signal to produce a selected one as the postcursor estimation signal in the symbol period.

18. The method according to claim 17, wherein all possible postcursor estimation signals are generated using all combinations of the past estimated signal and all possible values which are predetermined in an estimated signal.

* * * * *